United States Patent [19]

Lee

[11] Patent Number: 4,559,186

[45] Date of Patent: Dec. 17, 1985

[54] PRODUCTION OF BORATE CROSSLINKED POLYVINYL ALCOHOL CONTACT LENSES

[75] Inventor: Ping I. Lee, Valley Cottage, N.Y.

[73] Assignee: Ciba Geigy Corporation, Ardsley, N.Y.

[21] Appl. No.: 633,070

[22] Filed: Jul. 23, 1984

Related U.S. Application Data

[63] Continuation of Ser. No. 376,336, May 10, 1982, abandoned, which is a continuation-in-part of Ser. No. 308,742, Oct. 5, 1981, abandoned.

[51] Int. Cl.$^4$ ............................................. B29D 11/00
[52] U.S. Cl. ..................................... 264/2.1; 264/2.6; 351/160 H; 525/61
[58] Field of Search .................. 264/1.1, 2.1, 2.2, 2.7, 264/2.6; 351/160 H, 160 R; 523/106; 525/61, 62

[56] References Cited

U.S. PATENT DOCUMENTS

| 2,444,712 | 7/1948 | Segnaigo. | |
|---|---|---|---|
| 2,445,555 | 7/1948 | Binda. | |
| 3,193,542 | 7/1965 | Imai | 525/62 |
| 3,232,916 | 2/1966 | Fogle | 525/62 |
| 3,928,255 | 12/1975 | Milkovich et al. | 525/62 |

FOREIGN PATENT DOCUMENTS

| 47-6910 | 2/1972 | Japan | 264/2.6 |
|---|---|---|---|
| 49-35466 | 9/1974 | Japan | 351/160 H |
| 51-30749 | 3/1976 | Japan | 523/106 |

*Primary Examiner*—James Lowe
*Attorney, Agent, or Firm*—Michael W. Glynn

[57] ABSTRACT

Soft contact lenses of polyvinyl alcohol having a weight average molecular weight of at least about 6,000, crosslinked with borate in an effective amount, to increase the elastic modulus thereof, said lenses being substantially insoluble in the ocular tear fluid environment, and methods for their preparation are disclosed. These materials are characterized by their high water content, high dissolved oxygen permeability, high optical clarity and especially their superior mechanical strength.

12 Claims, No Drawings

PRODUCTION OF BORATE CROSSLINKED POLYVINYL ALCOHOL CONTACT LENSES

This is a continuation of application Ser. No. 376,336, filed May 10, 1982, now abandoned, which in turn is a continuation-in-part of Ser. No. 308,742, filed Oct. 5, 1981, and now abandoned.

BACKGROUND OF THE INVENTION

This invention relates to soft contact lenses made of borate crosslinked polyvinyl alcohol.

In general, existing hydrogel soft contact lens materials based on HEMA, also known as hydroxyethyl methacrylate or as ethyleneglycol monomethacrylate, polymers suffer from either weak mechanical strength, low dissolved oxygen permeability or a combination thereof.

Polyvinyl alcohol films and gels have been reported as ophthalmic inserts in the lower conjunctival sac when imbibed with antibiotics such as tetracycline, pilocarpine, atropine and the like. Such materials are either in the form of crosslinked film or as a water soluble viscous solution or gel. See, for example, Y. F. Maichuk, Ophthalmic Drug Inserts, *Invest. Ophthalmol.*, Vol. 14, pages 87-90 (1975); D. W. Lamberts, Solid Delivery Devices, *Int. Ophthalmol. Clinic*, Vol. 20, No. 3, pages 68-69 (1980) and Y. F. Maichuk, *Antibiotik*, Vol. 12, No. 4, pages 432-5 (1967). Also polyvinyl alcohol crosslinked with glyoxal has been proposed as a contact lens material. See U.S. Pat. No. 3,408,429. Unfortunately, the acetal and hemiacetal group formation which results from the crosslinking reaction is reversible under mildly acidic conditions, resulting in the potential release of glyoxal from the cross-linked material. Glyoxal is known to be an irritant to skin and mucosa.

In addition, soft contact lenses based upon crosslinked hydrogels generally require either costly lathing and polishing steps, or cumbersome centrifugal casting which is carried out while polymerization and crosslinking is performed in situ during the casting operation.

Further, the use of boric acid and polyvinyl acetate to treat films of polyvinyl alcohol to convert the film into a fogged or hazy state has been described. See *Chemical Abstracts*, Vol. 66, item 76674f (1967). In contrast, the instant borate-crosslinked polyvinyl alcohol contact lenses possess excellent optical clarity with no degradation of optical clarity being evident.

Crosslinked hydrophilic polymers and hydrogel soft contact lenses made therefrom are known in the art. Such polymers are generally based on HEMA, also known as hydroxyethyl methacrylate or ethyleneglycol monomethacrylate, with one or more optional comonomers as desribed in U.S. Pat. Nos. 2,976,576, 3,841,985 and 3,985,697. Other hydrogels based on N-vinylpyrrolidone copolymers and acrylamide copolymers are disclosed in U.S. Pat. Nos. 3,639,524 and 3,929,741. These prior art hydrogel polymers suffer from either weak mechanical strength, insufficient dissolved oxygen permeability or a combination thereof. Efforts to increase oxygen permeability by increasing the water content of the hydrogels result in a further decline in the mechanical strength of the lens materials to such an extent that they are extremely fragile.

It is an object of the present invention to provide soft contact lenses obviating or substantially reducing the aforementioned drawbacks of the prior art.

It is a further object of the present invention to provide contact lenses comprising polyvinyl alcohol which have been crosslinked with a borate such that the crosslinked lenses are subtantially insoluble in the ocular tear environment, possess a high water content, high dissolved oxygen permeability and superior mechanical strength.

It is a further object of the invention to provide rapid, simple, low cost molding and spin casting processes for the preparation of such lenses.

DETAILED DESCRIPTION OF THE INVENTION

The present invention provides optically clear soft contact lenses of swollen solid polyvinyl alcohol having a weight average molecular weight of at least about 6,000, crosslinked with a borate in an effective amount to increase the elastic modulus thereof, said lenses being substantially insoluble in tear fluid, the environment of use.

Preferably, the polyvinyl alcohol has a weight average molecular weight of at least about 10,000.

As an upper limit, the polyvinyl alcohol may have a weight average molecular weight of up to 1,000,000. Preferably, the polyvinyl alcohol has a weight average molecular weight of up to 300,000.

Polyvinyl alcohol is ordinarily prepared by hydrolysis of the corresponding polyvinyl acetate. In a preferred embodiment, the polyvinyl alcohol contains less than 1% of the polyvinyl acetate units.

Moreover, the polyvinyl alcohol may contain minor amounts of copolymer units of ethylene, propylene, acrylamide, methacrylamide, dimethacrylamide, hydroxyethylmethacrylate, methylmethacrylate, methyl acrylate, ethyl acrylate, vinyl pyrrolidone, hydroxyethylacrylate, allyl alcohol and the like. Preferably, the polymer should contain not more than 5% of units other than those of vinyl alcohol. Most preferably, the polyvinyl alcohol contains less than 1% of such copolymer units.

Commercial polyvinyl alcohol resin may be used, such as ELVANOL 71-30 manufactured by DuPont, or Vinol 125 manufactured by Air Products, Inc.

Preferably, the polyvinyl alcohol to be crosslinked is substantially insoluble in water up to 50° C., most preferably up to 60° C.

The polyvinyl alcohol resin is treated with an aqueous solution of a borate at a pH of greater than 7.

Suitable borates for crosslinking include the alkali metal and alkaline earth metal borates, ammonium borates and amine borates. These include, without limitation, ammonium borate, $NH_4HB_4O_7 \cdot 3H_2O$; calcium metaborate, $Ca(BO_2)_2$; calcium metaborate hexahydrate, $Ca(BO_2)_2 \cdot 6H_2O$; calcium tetraborate, $CaB_4O_7$; lithium metaborate, $LiBO_2$; lithium tetraborate, $Li_2B_4O_7 \cdot 5H_2O$; potassium metaborate, $K_2B_4O_7 \cdot 5H_2O$; sodium metaborate, $Na_2B_2O_4$ and the tetrahydrate thereof, $Na_2B_2O_4 \cdot 4H_2O$; sodium tetraborate, $Na_2B_4O_7$, the penta hydrate thereof, $Na_2B_4O_7 \cdot 5H_2O$ and the deca hydrate thereof, $Na_2B_4O_7 \cdot 10H_2O$; methylammonium hydrogen tetraborate, $NH_3CH_3HB_4O_7$; dimethylammonium hydrogen tetraborate, $NH_2(CH_3)_2HB_4O_7$; and the like.

Also, boric acid may be used in the crosslinking process, provided that the pH of the aqueous solution is adjusted to greater than 7.

Where a borate salt is used to provide the source of borate anions in aqueous solution, the nature of the cation moiety is not critical. For purposes of convenience, however, it is preferred that the cation be a pharmaceutically accceptable cation. This obviates a washing step wherein the crosslinked material is washed with a pharmaceutically acceptable base, or salt, to remove the undesired cation.

While not limited to the precise reaction mechanism by which crosslinking of the polyvinyl alcohol by a borate takes place at a pH greater than 7, it is believed that didiol complex formation occurs between adjacent molecules of polyvinyl alcohol as follows:

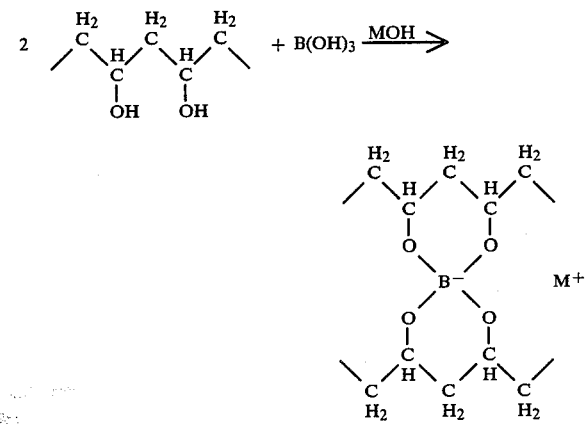

where M is a cation.

Under acid conditions, ie., where the pH is below 7, only the monodiol complex is believed to be formed, and the desired crosslinking does not occur:

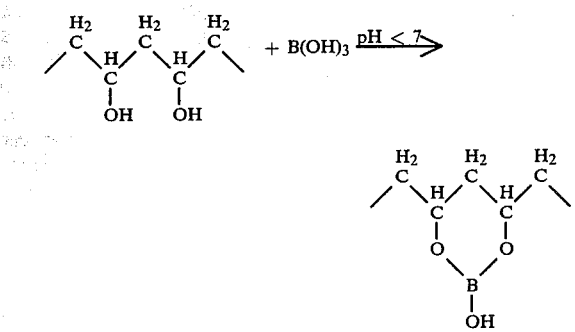

The amount of borate present in the crosslinked polyvinyl alcohol, in terms of milligrams of complexed boron per gram of polyvinyl alcohol, is advantageously between about 0.5 and 50, preferably between about 2 and 35, most preferably between about 5 and 25.

The amount of boron present in the crosslinked polyvinyl alcohol should be sufficient to increase the elastic modulus of the crosslinked material compared to the uncrosslinked polyvinyl alcohol starting material. The optimum amount of boron present to substantially increase the elastic modulus will, of course, vary to some extent depending, inter alia upon the molecular weight distribution and the swellability of the polyvinyl alcohol in water. The optimum amount of boron in any given polyvinyl alcohol substrate can be easily determined by varying the amount of boron present in polyvinyl alcohol samples and plotting the ratio of boron in milligrams to grams of polyvinyl alcohol versus the elastic modulus in pounds per square inch or kilograms per square centimeter.

A substantial excess of crosslinked boron in the polyvinyl alcohol substrate is ordinarily undesirable, to the extent it may adversely affect the elastic modulus of the polyvinyl alcohol.

The borate-crosslinked contact lenses according to the instant invention possess superior oxygen permeability in comparison, for example, with poly-hydroxyethylmethacrylate. Thus, the crosslinked polyvinyl alcohol possess a dissolved oxygen permeability, DK, of between about $20 \times 10^{-10}$ to $60 \times 10^{-10}$ [cm$^3$(STP) cm/cm$^2$ sec cm Hg], as compared to $8 \times 10^{-10}$ to $15 \times 10^{-10}$ [cm$^3$(STP) cm/cm$^2$ sec cm Hg] for poly-hydroxyethylmethacrylate.

Similarly, the tensile strength of the borate-crosslinked contact lenses according to the instant invention is far superior to that of poly-hydroxyethylmethacrylate. For example, the borate-crosslinked polyvinyl alcohol materials characteristically exhibit a tensile strength, in the swollen state, between about 100 to 2,000 psi, based on the original cross sectional area of the material, versus about 15 to 30 for poly-hydroxyethylmethacrylate.

It is important to note that the dissolved oxygen permeability, DK, is an intrinsic property of the contact lens material only, whereas the dissolved oxygen transmissibility, DK/L, describes the actual flux of oxygen per unit oxygen tension (partial pressure) difference across a given lens of thickness L. Thus the latter is important in determining the capability of a specific lens to meet the cornea oxygen demand. Generally, with the same lens material, the smaller the lens thickness the higher would be its dissolved oxygen transmissibility, DK/L.

As a consequence of the combination of the highly desirable tensile strength, elastic modulus, and high oxygen permeability properties of the instant materials, the resulting contact lenses may be advantageously fabricated either as ultra thin contact lenses having an extremely high oxygen transmissibility in excess of the cornea oxygen demand for continuous wearing while still possessing remarkably superior mechanical strength, e.g. having a center thickness between about 0.010 mm and about 0.1 mm, or alternatively, as relatively thick lenses while still possessing adequate oxygen transmissibility, e.g. having a center thickness between about 0.2 mm and about 0.5 mm.

In addition, the excellent optical clarity, softness and total surface wettability by tear fluid (characterized by a small contact angle) of the borate-crosslinked polyvinyl alcohol materials make them particularly suitable for use as soft contact lenses to provide wearing comfort, good optical acuity and necessary visual correction for the patients.

Thus, the instant contact lenses can advantageously possess a lens center thickness of between about 0.010 mm and about 0.5 mm. Ordinarily, for purposes of convenience, the instant contact lens preferably possesses a center thickness between about 0.03 and 0.25 mm. The instant contact lens diameter can range between about 6 to 20 mm, preferably between about 8 to 16 mm.

The instant borate crosslinked polyvinyl alcohol materials also exhibit superior elongation characteristics and elastic modulus as compared with poly-hydroxyethylmethacrylate.

The borate crosslinked polyvinyl alcohol materials possess increased resistance to visco-elastic deformation as compared to the non-crosslinked polyvinyl alcohol and are, consequently, subtantially free of the so called "cold flow" or creep phenomena commonly exhibited in amorphous thermoplastic lens materials. Because the instant borate-crosslinked polyvinyl alcohol materials possess a substantial absence of creep or "cold flow", they are resistant to permanent and significant deformation occasioned during eylid motion or lens cleaning.

Surprisingly, the increase in elastic modulus afforded by the borate-crosslinked polyvinyl alcohol contact lens materials, as compared to the untreated (non-crosslinked) polyvinyl alcohol, is coupled with an increase in tensile strength and in elongation at break of the borate-crosslinked lenses.

The crosslinked polyvinyl alcohol contact lenses contain, in their swollen use condition, between about 30 to 97 percent by weight water based upon the weight of swollen material, preferably between about 45 to 95 percent by weight water.

The instant contact lenses can be advantageously prepared by various methods.

In one embodiment, method A, the borate-crosslinked polyvinyl alcohol lens is prepared by the steps comprising (1) blending polyvinyl alcohol having a weight average molecular weight of at least about 6,000 and a sufficient amount of water, in the presence or absence of plasticizer, at a temperature of between about 50° to 100° C., to convert the blend to a molten liquid mass capable of solidifying to a substantially shape-retaining aqueous gel at a temperature below about 50° C.;

(2) transferring said molten mass into a mold cavity having a convex surface and a concave surface corresponding substantially to the configuration of a contact lens;

(3) cooling the mold to below about 50° C. to solidify said molten mass to a substantially shape-retaining aqueous gel of polyvinyl alcohol in the form of said contact lens;

(4) removing the substantially shape retaining aqueous gel of polyvinyl alcohol contact lens from the mold;

(5) reacting a borate in an amount sufficient to increase the elasticity modulus of the polyvinyl alcohol, with said substantially shape retaining aqueous gel of polyvinyl alcohol lens, in an aqueous medium at a pH above 7 to form a borate-crosslinked polyvinyl alcohol complex contact lens; and (6) recovering the borate-crosslinked polyvinyl alcohol contact lens.

Preferred plasticizers include polyols, such as ethylene glycol, propylene glycol, glycerol and ethylene glycol, mono- and di-methyl ether, tetrahydrofuran, sodium thiocyanate, ammonium thiocyanate, ethanolamine salts, such as triethanolamine acetate and triethanolamine hydrochloride, formamide, dimethylformamide and dimethylsulfoxide.

Most preferably, the plasticizer is glycerol or propylene glycol.

Where a polyol plasticizer, such as ethylene glycol, propylene glycol or glycerol, is incorporated into the blending step, step 1), supra, the plasticizer is advantageously removed from the aqueous gel of step 4) by washing the polyvinyl alcohol lens with water, prior to the crosslinking the polyvinyl alcohol with the borate in step 5).

In one embodiment of method A, the borate of step 5), in the above reaction sequence, is in the form of a borate salt. Preferred salts are the alkali metal, alkaline earth metal, amine and ammonium salts. Most preferred is sodium tetraborate.

In an alternative embodiment of method A, boric acid is added to the aqueous medium in step 5), in the above reaction sequence, and the medium is adjusted to a pH above 7 by the appropriate addition of a base. Preferred bases include alkali metal hydroxides, ammonium hydroxide, alkaline earth metal hydroxides and the like. Most preferred are sodium hydroxide, potassium hydroxide and ammonium hydroxide.

In yet another alternate embodiment of method A, boric acid is added to the polyvinyl alcohol and water medium in step 1), supra, of the reaction sequence, thereby forming the substantially non-crosslinking monodiol borate complex, and in step 5) there is added base in an amount sufficient to raise the pH to above 7, thereby forming the borate-crosslinked complex with polyvinyl alcohol. In this embodiment the blending operation of step 1) is performed in the substantial absence of a polyol plasticizer such as ethylene glycol, propylene glycol or glycerol, since such polyols tend to react with boric acid.

In an alternate embodiment, method B, the borate-crosslinked polyvinyl alcohol lens is prepared by the steps comprising (1) dissolving polyvinyl alcohol having a weight average molecular weight of at least about 6,000 in water, and in the presence or absence of a plasticizer at an elevated temperature to form a homogeneous solution, capable, upon drying, of solidifying to a substantially shape-retaining gel;

(2) transferring said homogeneous solution to a contact lens mold having a concave, preferably continuously curved, upwardly extending, solid supporting surface of an extent equal to or greater than the lens to be formed therein, rotating the mold about an axis transverse to the supporting surface at a speed sufficient to cause radially outward displacement of said homogeneous solution under centrifugal force, while evaporating the water from said solution, for a time sufficient to dry the mixture to a substantially shape-retaining gel of polyvinyl alcohol, corresponding substantially to the configuration of a contact lens;

(3) removing the sustantially shape retaining gel of polyvinyl alcohol in the form of said contact lens from the mold;

(4) reacting a borate, in an amount sufficient to increase the elastic modulus of said polyvinyl alcohol, with said substantially shape retaining gel of polyvinyl alcohol lens, in an aqueous medium at a pH above 7 to form a borate-crosslinked polyvinyl alcohol complex contact lens; and (5) recovering the borate-crosslinked polyvinyl alcohol contact lens.

Suitable plasticizers are those recited above in method A. In method B, where a polyol plasticizer, such as propylene glycol, ethylene glycol or glycerol, is incorporated as the plasticizer in the dissolution step, step 1), the plasticizer is advantageously removed by washing the lens with water after removal of the lens from the mold, prior to the crosslinking step, step 5).

In step 1) of method B, the dissolution of polyvinyl alcohol in the mixture of plasticizer and water is accomplished advantageously by heating the plasticizer, water and polyvinyl alcohol to an elevated temperature of between 50° to 100° C.

Preferably, the amount of plasticizer when present, is present in an amount between about 0.01 and 70 percent by weight, based upon the total weight of the plasticizer and polyvinyl alcohol; more preferably, between 0.01 and 30 percent by weight in methods A and B.

The homogeneous solution of step 1) in method B advantageously contains between 5 and 30 percent by weight of polyvinyl alcohol polymer, preferably between 10 and 20 percent by weight, based on the weight of solution.

As in method A, boric acid may be added in step 1) of method B to form the non-crosslinking monodiol complex, which is converted to the borate crosslinked polyvinyl alcohol complex in step 4) by raising the pH above 7, or boric acid may be added to the aqueous medium of step 4) and the aqueous medium adjusted to a pH above 7 by addition of a base, or the borate of step 4) is in the form of a borate salt, as set forth in method A.

In a further alternate embodiment, method C, the borate-crosslinked polyvinyl alcohol lens is prepared by the steps comprising (1) placing a polyvinyl alcohol film wherein the polyvinyl alcohol has a weight average molecular weight of at least about 6,000, optionally containing a plasticizer, on a first preheated, shaped mold having a convex or concave surface corresponding to the configuration of one surface of a contact lens, to soften said film;

(2) stamping out a lens material therefrom with a second cutting and shaping mold having a concave or convex surface corresponding to the configuration of the second surface of the contact lens, such that said first mold and second mold engage to form a cavity, containing said polyvinyl alcohol, corresponding substantially to the configuration of the contact lens;

(3) cooling the engaged molds sufficient to harden the polyvinyl alcohol in said cavity to a substantially shape retaining article in the form of said contact lens;

(4) disengaging the molds and removing the substantially shape-retaining article of polyvinyl alcohol in the form of said contact lens therefrom;

(5) reacting a borate, in an amount sufficient to increase the elastic modulus of said polyvinyl alcohol, with said substantially shape retaining article of polyvinyl alcohol, in an aqueous medium at a pH above 7 to form a borate crosslinked polyvinyl alcohol complex contact lens; and (6) reqovering the borate crosslinked polyvinyl alcohol contact lens.

In the alternate embodiment of method C, the polyvinyl alcohol film may be prepared by methods known, per se.

For example, the polyvinyl alcohol film may be cast from an aqueous solution thereof, with or without a plasticizer, by evaporation.

If desired, a plasticizer, such as those mentioned above in reference to method A, may be employed as a component in the polyvinyl alcohol film of step 1) of method C in an amount of between about 0.01 to 70 percent by weight, preferably between about 0.01 to 30 percent, based upon the plasticizer plus polyvinyl alcohol weight. In the event a plasticizer is employed in step 1) of method C, the plasticizer may be removed from the molded contact lens of step 4) prior to the reaction of step 5). Substantial removal of plasticizer is especially desirable where the plasticizer is a polyol plasticizer, such as ethylene glycol, propylene glycol or glycerol, and is accomplished by washing said molded contact lens of step 4) with water.

As an alternate embodiment of method C, boric acid may be incorporated in the polyvinyl alcohol film of step 1), e.g., by casting the film from an aqueous polyvinyl alcohol solution containing the desired amount of boric acid in the substantial absence of a polyol plasticizer. In this embodiment the boric acid is present in the film of step 1) as the substantially non-crosslinked monodiol borate complex, and in step 5), there is added base in an amount sufficient to raise the pH to above 7, thereby forming the borate-crosslinked complex with polyvinyl alcohol. Alternatively, boric acid may be added to the aqueous medium of step 5) and the aqueous medium adjusted to a pH above 7 by the addition of a base, or the borate of step 5) is in the form of a borate salt, as set forth in method A.

It is understood that spherical, toric and polyfocal lenses, for use in the human eye, including bifocal contact lenses, having powers covering the ranges from about −20 to about +20 diopters can be advantageously prepared by methods A, B and C, described supra. Thus, for example, the overall concave surface of the molds in methods A, B and C may contain planar or convex regions where an overall negative diopter, or multiple diopters are desired.

It is further understood that the instant borate-crosslinked polyvinyl alcohol lenses are swollen with aqueous fluid under use conditions and this is taken into account in determining the configuration of the lens molds. As a result, the configuration of the lens molds is calculated based upon the extent of swelling which occurs subsequent to the lens molding step, e.g. upon subsequent aqueous treatment such as in the aqueous medium in which the borate-crosslinking occurs. As the swollen lens is substantially uniform in crosslinked polyvinyl alcohol density, said calculation is straightforward and is dependent upon the percent of water present in the contact lens in their swollen use condition as compared to the amount of water present in the lens as produced in the mold.

As the artisan can appreciate, when the borate is introduced into the borate reaction step in methods A, B and C, for example, the borate diffuses from the aqueous medium into the swollen lens, and ultimately achieves a relatively uniform crosslinking density throughout the swollen lens medium. When the borate is present in the polyvinyl alcohol prior to crosslinking as the monodiol complex, it is substantially uniformly distributed throughout the lens medium.

The preferred and most preferred plasticizers, bases and borate salts in methods B and C. are those set forth in the embodiments of method A.

In addition to the multiple advantageous properties of the instant borate-crosslinked polyvinyl alcohol contact lenses recited above, the instant lenses are also characterized by their unexpectedly low extraction rate of borate from said lenses under use conditions. As a result, said lenses are remarkably stable.

Moreover, the instant lenses are highly resistant to bacterial attack, in contrast to non-crosslinked polyvinyl alcohol lenses.

The contact lens of the instant invention may advantageously be stored for shipping in an isotonic solution having a pH of about 7, or if desired, in an aqueous borate solution.

The following examples are intended as only illustrative and are not intended to limit the nature or scope of the invention. All parts are by weight unless otherwise indicated.

EXAMPLE 1

Two parts of Elvanol 71-30 (99-100 mole % hydrolyzed polyvinyl alcohol with the weight-average and number-average moleular weights of 116,000 and 40,000 respectively, manufactured by DuPont) was blended with 2 parts of glycerol and 4 parts of distilled water to form a slurry having a reduced melting point of about 90° C. The slurry was heated in an oven at 100° C. until the molten state was achieved. Approximately 0.1 gm of the molten mass was charged into the cavity of the concave part of a lens shaped mold which had a radius of curvature of 0.6 cm and was preheated to 100° C. Subsequently, the matching convex part of the mold, which had a radius of curvature of 0.71 cm and was also preheated to 100° C., was placed on top of the said cavity and compressed on a laboratory press.

The mold was then allowed to cool down gradually to room temperature and set for about 10 hours before opening the mold to ensure complete gelation and lens formation. Afterwards, the lens shaped article was washed in distilled water overnight to remove the residual glycerol. The swollen lens was subsequently allowed to equilibrate in a 0.5% sodium borate aqueous solution having a pH of 9.2, to complete the crosslinking. The crosslinked lens was then stored in isotonic saline (pH 7.0). The lens so formed was soft, resilient, tear resistant and optically clear with an equilibrium water content of 79.72% by weight.

EXAMPLE 2

A polyvinyl alcohol film of 0.038 cm dry thickness containing 3.4% glycerol as plasticizer was knife cast from an 18% aqueous solution of Elvanol 71-30, initially containing 0.6% glycerol and subsequently air dried for two days at 23° C. and 40% relative humidity.

The transparent and thermoplastic polyvinyl alcohol film so formed was compressed on a laboratory press for a period of about 10 seconds between the two mold parts of Example 1 except that the matching convex part of the mold had a radius of curvature of about 0.635 cm and the entire mold was preheated to 180° C. A lens shaped article was thus formed and separated from the said film. The formed lens was then removed from the mold and cooled to room temperature.

Afterwards the formed lens was washed in distilled water overnight to remove the residual glycerol. The swollen lens was subsequently allowed to equilibrate in a 0.5% sodium borate aqueous solution having a pH of 9.2 to complete the crosslinking. The lens was ultimately stored in isotonic saline (pH 7.0). The lens so formed was soft, resilient, tear resistant and optically clear with an equilibrium water content of 48.85% by weight.

EXAMPLE 3

A 10% aqueous polyvinyl alcohol solution containing 0.34% glycerol was prepared by dissolving appropriate amounts of Elvanol 71-30 and glycerol in water at 100° C. The resulting solution had a Brookfield viscosity about 1,500 cps at room temperature (23° C.).

About 43 mg of said solution was charged into a glass mold having a spherical concave solid supporting surface with radius of curvature of 0.5 cm. The mold, having a segment height of 0.4 cm was then attached to a chuck and allowed to rotate about the axis transverse to the supporting surface at 350 revolutions per minute (rpm) by the use of a variable speed motor. Such a spinning process not only shaped the lens by centrifugal force but also generated a convection of ambient air to facilitate the drying of the lens. After four hours of drying at 350 rpm under room conditions (23° C. and 40% relative humidity), the lens shaped article was dried to touch.

Afterwards, the mold containing the dry lens was immersed in distilled water at 23° C. to swell the formed lens so it could be removed from the mold. The swollen lens was then washed in distilled water overnight to remove the residual glycerol and subsequently equilibrated in a 0.5% sodium borate aqueous solution having a pH of 9.2 to complete the cross-linking. Finally the crosslinked lens was stored in isotonic saline (pH 7.0). The lens so formed was soft, resilient, tear resistant and optically clear with an equilibrium water content of 88.3% by weight.

EXAMPLE 4-9

A series of borate crosslinked polyvinyl alcohol lenses were prepared as described in Example 3 except that no glycerol was added to the casting solution, and sodium borate solutions of concentration up to 4% were used to achieve a range of internal borate crosslinking concentrations. The composition of each lens was tested for its dissolved oxygen permeability at 34° C., the eye temperature, with the use of a polarographic sensor in an air saturated aqueous environment. The wet mechanical properties of the swollen lens composition including tensile strength, elongation at break and elastic modulus were determined on an Instron tester model 1123. These test results are summarized in Table 1.

TABLE 1

| Example No. | Internal Boron Concentration in dry PVA[2] (mg/g) | Water Content % | Dissolved Oxygen Permeability at 34° C. $\times 10^{-10} \frac{cm^3 (STP) \, cm}{cm^2 \, sec \, cm \, Hg}$ | Tensile Strength (psi) | Elongation at Break % | Elastic Modulus (psi) |
|---|---|---|---|---|---|---|
| 4 | 0 | 82.72 | 44.71 | 117.9 | 240 | 33.8 |
| 5 | 9.97 | 89.61 | 45.24 | 380.9 | 462 | 61.1 |
| 6 | 20.14 | 92.15 | 34.88 | 243.8 | 294.3 | 68.6 |
| 7 | 34.76 | 92.02 | 30.65 | 158.5 | 260.8 | 35.6 |
| 8 | 58.26 | 91.78 | — | 85.4 | 209.5 | 29.8 |
| 9 | poly-HEMA[1] (control) | 35.88 | 10.28 | 16.5 | 40 | 53.4 |

[1]poly(2-hydroxyethyl methacrylate) crosslinked with ethylene glycol dimethacrylate.
[2]polyvinyl alcohol The results of the tests shown in Table 1 illustrate the advantageous increase in tensile strength and elongation at break, as well as elastic modulus, coupled with high oxygen permeability afforded by the instant borate-crosslinked polyvinyl alcohol materials especially in comparison with a conventional poly-HEMA contact lens material.

EXAMPLE 10

A 10% aqueous polyvinyl alcohol solution containing about 1% boric acid was prepared by dissolving appropriate amounts of Elvanol 71-30 and boric acid in water at 100° C. The resulting solution had a Brookfield viscosity about 1,600 cps at 23° C.

About 40 mg of the said solution was charged into the glass contact lens mold of Example 3 and spin dried at 300 rpm according to the procedures and conditions set forth in Example 3.

Afterwards, the mold containing the dry lens was immersed in a 0.01 M NaOH solution to convert boric acid into sodium borate in-situ to achieve the desired crosslinking. Subsequently, the crosslinked lens was removed and stored in isotonic saline. The lens so formed was soft, resilient, tear resistant and optically clear with an equilibrium water content of 90.0% by weight.

What is claimed is:

1. A process for preparing an optically clear soft contact lens of swollen solid polyvinyl alcohol having a weight average molecular weight of at least about 6,000, crosslinked with a borate in an effective amount to increase the elastic modulus thereof, said lens being substantially insoluble in the tear fluid environment, comprising
   (1) blending polyvinyl alcohol having a weight average molecular weight of at least about 6,000 and a sufficient amount of water, at a temperature of between about 50° to 100° C., to convert the blend to a molten liquid mass capable of solidifying to a substantially shape retaining aqueous gel at a temperature below about 50° C.;
   (2) transferring said molten mass into a mold cavity having a convex surface and a concave surface corresponding substantially to the configuration of a contact lens;
   (3) cooling the mold to below about 50° C. to solidify said molten mass to a substantially shape retaining aqueous gel of polyvinyl alcohol in the form of said contact lens;
   (4) removing the substantially shape retaining aqueous gel of polyvinyl alcohol contact lens from the mold;
   (5) reacting a borate in an amount sufficient to increase the elastic modulus of the polyvinyl alcohol, with said substantially shape retaining aqueous gel of polyvinyl alcohol lens, in an aqueous medium at a pH above 7 to form a borate-crosslinked polyvinyl alcohol complex contact lens; and
   (6) recovering the borate-crosslinked polyvinyl alcohol contact lens.

2. A process according to claim 1, wherein a plasticizer is incorporated into the blending step, step 1), and is ethylene glycol, propylene glycol, glycerol, ethylene glycol monomethyl ether, ethylene glycol dimethyl ether, tetrahydrofuran, sodium thiocyanate, ammonium thiocyanate, ethanolamine salts, formamide, dimethylformamide or dimethylsulfoxide.

3. A process according to claim 2, wherein the plasticizer is glycerol or propylene glycol.

4. A process according to claim 2, wherein the plasticizer is ethylene glycol, propylene glycol or glycerol and is incorporated into the blending step, step 1) and is removed from the aqueous gel of step 4) by washing the polyvinyl alcohol lens with water, prior to crosslinking the polyvinyl alcohol with the borate in step 5).

5. A process according to claim 1, wherein the borate of step 5) is in the form of an alkali metal, alkaline earth metal, amine or ammonium borate.

6. A process according to claim 5, wherein the borate is sodium tetraborate.

7. A process according to claim 1, wherein boric acid is added to the aqueous medium of step 5) and the medium adjusted to a pH above 7 by the addition of a base.

8. A process according to claim 1, wherein boric acid is added to the polyvinyl alcohol and water medium of step 1) in the substantial absence of a polyol plasticizer, and in step 5) base is added to the aqueous medium in an amount sufficient to raise the pH above 7.

9. A process according to claim 4, wherein the weight of plasticizer present is between about 0.01 and 70 percent by weight, based upon the weight of plasticizer plus polyvinyl alcohol.

10. A process for preparing an optically clear soft contact lens of swollen solid polyvinyl alcohol having a weight average molecular weight of at least about 6,000, crosslinked with a borate in an effective amount to increase the elastic modulus thereof, said lens being substantially insoluble in the tear fluid environment, comprising
    (1) dissolving polyvinyl alcohol having a weight average molecular weight of at least about 6,000 in water, at an elevated temperature to form a homogeneous solution capable, upon drying, of solidifying to a substantially shape retaining gel;
    (2) transferring said homogeneous solution to a contact lens mold having a concave upwardly extending solid supporting surface of an extent equal to or greater than the lens to be formed therein, rotating the mold about an axis transverse to the supporting surface at a speed sufficient to cause radially outward displacement of said homogeneous solution under centrifugal force, while evaporating the water from said solution, for a time sufficient to dry the mixture to a substantially shape retaining gel of polyvinyl alcohol corresponding substantially to the configuration of a contact lens;
    (3) removing the substantially shape retaining gel of polyvinyl alcohol in the form of said contact lens from the mold;
    (4) reacting a borate, in an amount sufficient to increase the elastic modulus of said polyvinyl alcohol, with said substantially shape retaining gel of polyvinyl alcohol lens, in an aqueous medium at a pH above 7 to form a borate crosslinked polyvinyl alcohol complex contact lens; and
    (5) recovering the borate crosslinked polyvinyl alcohol contact lens.

11. A process according to claim 10, wherein a plasticizer is present in step 1) in an amount between about 0.01 and 70 percent by weight, based upon the total weight of the plasticizer and polyvinyl alcohol.

12. A process according to claim 10, wherein the homogeneous solution of step 1) contains between about 5 and 30 percent by weight of polyvinyl alcohol, based on the weight of solution.

* * * * *